United States Patent [19]
Bailey

[11] 3,790,021
[45] Feb. 5, 1974

[54] PLASTIC CONTAINER WITH DISPOSABLE INNER CONTAINER

[76] Inventor: Isabel W. Bailey, 8341 S.W. 137th Ave., Miami, Fla. 33143

[22] Filed: June 30, 1972

[21] Appl. No.: 267,898

[52] U.S. Cl. ............... 220/63 R, 229/14 B, 220/17
[51] Int. Cl. ..................... B65d 25/14, B65d 25/34
[58] Field of Search...... 220/63 R, 17, 65; 229/14 B

[56] References Cited
UNITED STATES PATENTS
3,729,112   4/1973   Gibbs ............................... 220/63 R
3,662,944   5/1972   Joosten ............................. 220/63 R Primary Examiner—George T. Hall

[57] ABSTRACT

A lightweight container for soft drinks or the like comprising an outer cylindrical container of form-retaining plastic and a disposable inner container of thinner, flexible plastic which takes the shape of the outer container. Stiffening rings are placed at the top and bottom of the outer container, the top ring overhanging the upper edge of the outer container and receiving the crimped-over edge of a metallic cap. The material of the liner is polyester of approximately 1½ mils thickness and that of the outer container is either polyester or 5 mil Mylar conditioned by laminates or otherwise to withstand the elements, or a laminate of these materials.

5 Claims, 2 Drawing Figures

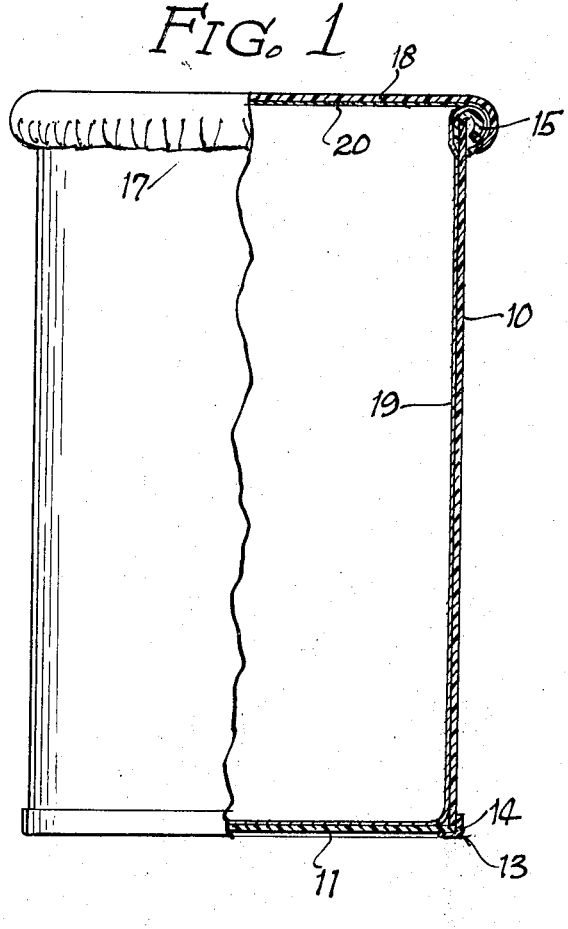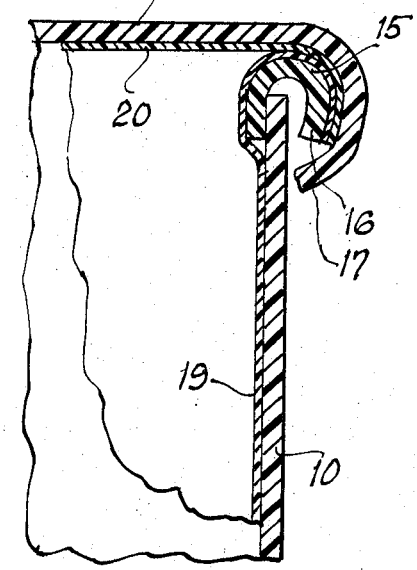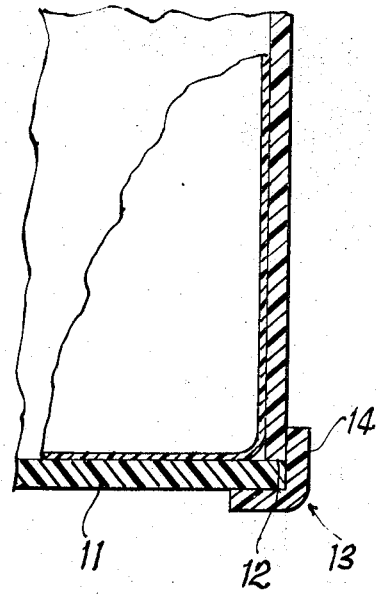

3,790,021

PLASTIC CONTAINER WITH DISPOSABLE INNER CONTAINER

This invention relates to lightweight containers for soft drinks which may or may not be carbonated.

A large percentage of soft drinks presently sold is distributed in glass bottles which are intended to be returned to the bottler for washing and refilling. If of the disposable variety, they are nevertheless approximately of the same weight as glass bottles and pose the further undesirable problem of providing for their disposal. The purchaser of soft drinks at a shopping center or supermarket buys them in packs of six or eight and although frequently assisted in carrying them to his car at the point of purchase, must carry them from the car to his home and then back again to return the empty bottles or otherwise dispose of them. The distributor must also provide vehicles sufficiently strong for transporting the heavy glass bottles, and the driver of the vehicle must transport the filled bottles from the vehicle to the supermarket or shopping center and the empty bottles back to the vehicle all of which entails the expenditure of extra energy to handle the dead weight of the bottles.

Present plastics technology has produced transparent lightweight substances which are suitable for molding into bottles for hard liquor, the bottles being disposable when empty. Other substances, some of which are not transparent, have been molded into bottles for milk, antifreezes and liquid cleaning substances such as detergents and soaps, such bottles again being disposable when empty. However, the disposition of other plastic bottles in general poses a problem since the plastic bottles retain their shape, cannot be readily broken up or crushed and do not burn readily.

Carbonated drinks are bottled under pressure and the plastic bottles presently available are not suited to containing liquids under pressure. They are generally too soft and flexible to retain their shape under pressure and some are porous to the extent that the gas pressure required for carbonated drinks cannot be held.

It is an object of this invention to provide a lightweight container for carbonated beverages or the like which is for the most part reusable.

As a more specific object this invention has within its purview the provision of a rigid container of plastic material and a thin, disposable liner of a material which is impervious to the contained liquid, the rigid container being reusable.

These and other objects of this invention will become apparent from the following detailed description when taken together with the accompanying drawings in which:

FIG. 1 is a side elevational view of the container partly in section to show the construction thereof, and FIG. 2 is a greatly enlarged fragmentary side elevation in section of the top and bottom corners of the container of FIG. 1.

According to this invention, the container for carbonated beverages is made of tubular form, somewhat like the aluminum or tin cans in wide use for such beverages. The side wall of the container is made of polyester plastic or of the material sold by DuPont under the trademark "Mylar," which is suitably formed by rolling from a sheet or otherwise into a cylinder, the overlapping ends being adhered together. The bottom is a disc of rigid material, either the same material as the side wall, or different material and is secured to the end of the tubular wall by a ring which is adhered to both the disc and the wall. The top is preferably made of metal crimped over a lip formed around the rim of the tubular wall by a ring similar to the bottom ring and adhered to the said wall. A liner of polyester of about 0.0015 inches in thickness rests loosely in the container and extends around the lip under the crimped portion of the cap. After the contents of the container are removed, the liner is discarded along with the cap, and the remainder is returned to the bottler for cleaning and reuse.

Referring now to the drawings for a detailed description of the invention, the tubular wall of the container is shown at 10 and is made of a polyester plastic or DuPont material sold under the trademark "Mylar." The walls are approximately 0.005 inch thick, if Mylar is used, or of a thickness sufficient not only to withstand stacking of containers without buckling but also the radial pressure of the carbonated liquid to be held therein. The Mylar is laminated with polyethylene or otherwise treated on both the inside and outside surfaces to render said surfaces impervious to moisture, gas and the effects of exposure to sunlight.

The bottom end of the tubular body portion 10 is closed by a disc 11 which abuts upon the end 12 of said tubular body portion. Disc 11 may be made of rigid material such as polyester, fiberglass or metal, of sufficient thickness to withstand the gas pressure of the contained carbonated liquid. It is secured to the bottom end of tubular body portion 10 by a flanged ring 13 the flange 14 of which fits closely around tubular body portion 10 and is made of rigid polyester. Said ring 13 is united with and sealed to both disc 11 and body portion 10 by an adhesive appropriate for the materials of the body portion and disc.

The upper end of tubular body portion 10 is received in a ring 15 of inverted U-shape in radial cross section, said ring being made of rigid polyester and having its radially inner leg fitting snugly against the inside of body portion 10 to which it is secured by an appropriate adhesive. The radially outer leg may also overlie the outside of body portion 10 and be adhered to it, or it may be spaced therefrom as shown in FIG. 2 to provide a wide lip and a ledge 16 which may be utilized as an abutment to which is secured the crimped edge 17 of a disposable metal cap 18.

The interior of the container formed as described above is lined with a separately formed film 19 of polyester of approximately 0.0015 inch in thickness having the shape of the interior of the container and extending over and around lip 16 as shown in FIG. 2. Said liner is sufficiently elastic to take the form of the interior of the container when subjected to the gas pressure of the carbonated liquid. The interior of the cap 18 is also lined with a film 20 of polyester of approximately 0.0015 inch in thickness which overlies the inner liner at the lip 15 and may be heat-sealed thereto if desired at the time the cap is crimped around abutment 16.

In use, ring 15, body portion 10, disc 11 and flanged ring 13 form a reusable unit which is returned to the bottler when emptied. Said unit is cleaned and sanitized and then lined with liner 19. The mouth of liner 19 is wrapped around ring 15 and adhered thereto by an appropriate means, after which the carbonated liquid is poured into the liner. The lined cap 18 is placed over the mouth of liner 19 and crimped around abutment 16, with or without heat-sealing and the filled container is then handled as an ordinary can of beverage. It can be packed in packages of six or more of such containers, and the packages may be stacked upon one another as is customary in shipping, storing and displaying beverages.

The purchaser of the container gains access to the liquid therein by prying up cap 18 from lip 15 and, if cap liner 20 is adhered or heat-sealed to liner 19, said cap liner is broken or slit and the contents then removed. When the container is empty, liner 19 may be removed and discarded and the container consisting of body portion 10, disc 11 and rings 13 and 15 is returned to the point of purchase from whence it is taken by the bottler for refilling.

The proportions and shape of the container may vary as desired. Thus instead of being cylindrical, the container may be frusto-conical, and if frusto-conical, the mouth may be wider than the base to allow stacking of the returned containers to conserve space.

I claim:

1. A container for beverages comprising a rigid tubular body portion of polyester plastic, a disc of rigid material closing one end of the tubular body portion, a flanged ring of rigid material overlying the rim of the disc and having its flange snugly embracing the end of the tubular body portion closed by the disc, adhesive material interposed between the ring, disc and tubular body portion, a removable liner of soft flexible material in the container and overlying the other end of the tubular body portion, and a metal cap over the said other end of the tubular member and compressing the liner against said other end of the tubular member to form a seal thereat.

2. A container as described in claim 1, and including further a second rigid ring of substantially inverted U-shape encircling the said other end of the tubular member and secured thereto, said liner extending over said second rigid ring, and said cap being crimped over said second rigid ring.

3. A container as described in claim 1, said first and second rings being made of polyester plastic.

4. A container as described in claim 1, said disc being made of polyester plastic and said cap having a liner of flexible polyester plastic which extends over and in contact with the liner.

5. A container as described in claim 4, said cap liner and first-mentioned liner being heat-sealed together.

* * * * *